United States Patent
Ajan et al.

(10) Patent No.: US 10,090,014 B1
(45) Date of Patent: Oct. 2, 2018

(54) HEAT ASSISTED MAGNETIC RECORDING WITH AN ANISOTROPIC HEAT SINK

(71) Applicant: WESTERN DIGITAL TECHNOLOGIES, INC., San Jose, CA (US)

(72) Inventors: Antony Ajan, San Jose, CA (US); Kumar Srinivasan, Redwood City, CA (US); Ning Ye, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/813,332

(22) Filed: Nov. 15, 2017

(51) Int. Cl.
| | |
|---|---|
| G11B 5/66 | (2006.01) |
| G11B 5/84 | (2006.01) |
| G11B 11/105 | (2006.01) |
| G11B 5/127 | (2006.01) |
| G11B 5/65 | (2006.01) |
| G11B 5/00 | (2006.01) |

(52) U.S. Cl.
CPC .......... *G11B 5/8404* (2013.01); *G11B 5/1278* (2013.01); *G11B 5/656* (2013.01); *G11B 5/66* (2013.01); *G11B 11/10589* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 5,981,017 A | 11/1999 | Agarwal et al. | |
| 7,548,398 B2 * | 6/2009 | Kamimura | G11B 5/855 360/135 |
| 8,345,374 B2 * | 1/2013 | Sendur | B82Y 10/00 360/77.01 |

(Continued)

OTHER PUBLICATIONS

Cometto, et al., "Control of Nanoplane Orientation in voBN for High Thermal Anisotropy in a Dielectric Thin Film: A New Solution for Thermal Hotspot Mitigation in Electronics," ACS Applied Materials & Interfaces, 9, Feb. 10, 2017, pp. 7456-7464.

(Continued)

*Primary Examiner* — William J Klimowicz
(74) *Attorney, Agent, or Firm* — Foley & Lardner LLP

(57) ABSTRACT

A magnetic recording medium for heat assisted magnetic recording (HAMR) including in ascending vertical sequence: (i) a substrate; (ii) a first amorphous layer, a first seed layer, or a combination thereof; (iii) a heat sink layer comprising hexagonal boron-nitride grains; (iv) an optional second amorphous layer; (v) an optional second seed layer; (vi) a magnetic recording layer; (vii) an optional capping layer; and (viii) an optional overcoat layer; wherein: the magnetic recording medium has a substrate plane and a basal plane perpendicular to the substrate plane; the heat sink layer is anisotropic and has an a-axis thermal conductivity in the basal plane and a c-axis thermal conductivity in the substrate plane, wherein the a-axis thermal conductivity is greater than the c-axis thermal conductivity; and the hexagonal boron-nitride grains have an average size of at (Continued)

least about 10 nm in the substrate plane. Also, provided is a method of manufacturing the magnetic recording medium for HAMR.

20 Claims, 6 Drawing Sheets

(56) References Cited

U.S. PATENT DOCUMENTS

| | | | | |
|---|---|---|---|---|
| 8,507,114 B2* | 8/2013 | Peng | ........................ | G11B 5/73 |
| | | | | 428/827 |
| 8,509,039 B1 | 8/2013 | Huang et al. | | |
| 8,765,273 B1* | 7/2014 | Kubota | .................... | G11B 5/66 |
| | | | | 360/59 |
| 9,207,024 B2* | 12/2015 | Ju | .............................. | F28F 3/08 |
| 9,263,076 B1 | 2/2016 | Peng et al. | | |
| 9,443,545 B2 | 9/2016 | Mosendz et al. | | |
| 9,449,633 B1* | 9/2016 | Pirzada | .................... | G11B 5/84 |
| 9,530,445 B1* | 12/2016 | Grobis | .................... | G11B 5/732 |
| 2004/0240327 A1* | 12/2004 | Sendur | .................... | B82Y 10/00 |
| | | | | 369/13.35 |
| 2012/0251842 A1 | 10/2012 | Yuan et al. | | |
| 2013/0004796 A1* | 1/2013 | Peng | ........................ | G11B 5/66 |
| | | | | 428/827 |
| 2015/0017482 A1* | 1/2015 | Lee | ........................ | G11B 5/746 |
| | | | | 428/833.1 |
| 2015/0179204 A1* | 6/2015 | Mosendz | ............. | G11B 5/7325 |
| | | | | 369/13.33 |
| 2016/0148632 A1* | 5/2016 | Hellwig | .................... | G11B 5/66 |
| | | | | 360/75 |
| 2016/0267934 A1 | 9/2016 | Furuta et al. | | |

OTHER PUBLICATIONS

Jubert, et al., "Optimizing the Optical and Thermal Design of Heat-Assisted Magnetic Recording Media," IEEE Transactions on Magnetics, vol. 53, No. 2, Feb. 2017 (9 pages).

* cited by examiner

HEAT ASSISTED MAGNETIC RECORDING WITH AN ANISOTROPIC HEAT SINK

BACKGROUND

Heat-assisted magnetic recording (HAMR) is a recent technological development that is designed to increase the areal density (AD) of written data by recording data in a magnetic recording medium having higher coercivity, $H_c$, than can be written by a magnetic field from a magnetic recording head without assistance. By heating the surface of the magnetic recording medium with a laser spot during write operations, coercivity of the magnetic recording medium is reduced so that the magnetic field of the magnetic recording head can record data in the magnetic recording medium at high AD.

FIELD

In general, the present technology relates to the field of magnetic recording. More specifically, the present technology relates to a magnetic recording medium for HAMR that includes an anisotropic heat sink layer.

SUMMARY

In one aspect, the present technology is directed to a magnetic recording medium for HAMR that includes in ascending vertical sequence: (i) a substrate; (ii) a first amorphous layer, a first seed layer, or a combination thereof; (iii) a heat sink layer comprising hexagonal boron-nitride grains; (iv) an optional second amorphous layer; (v) an optional second seed layer; (vi) a magnetic recording layer; (vii) an optional capping layer; and (viii) an optional overcoat layer; wherein the magnetic recording medium has a substrate plane and a basal plane perpendicular to the substrate plane; the heat sink layer is anisotropic and has an a-axis thermal conductivity in the basal plane and a c-axis thermal conductivity in the substrate plane, wherein the a-axis thermal conductivity is greater than the c-axis thermal conductivity; and the hexagonal boron-nitride grains have an average size of at least about 10 nm in the substrate plane. In some embodiments, the heat sink layer has a thermal conductivity of at least about 45 W/mK in the basal plane. In some embodiments, the heat sink layer has a thermal conductivity of no more than about 40 W/mK in the substrate plane.

In another aspect, the present technology is directed to a method of manufacturing a magnetic recording medium for HAMR that includes providing sequentially: (i) a substrate; (ii) a first amorphous layer, a first seed layer, or a combination thereof; (iii) a heat sink layer comprising hexagonal boron-nitride grains; (iv) an optional second amorphous layer; (v) an optional second seed layer; (vi) a magnetic recording layer; (vii) an optional capping layer; and (viii) an optional overcoat layer; wherein the magnetic recording medium has a substrate plane and a basal plane perpendicular to the substrate plane; the heat sink layer is anisotropic and has an a-axis thermal conductivity in the basal plane and a c-axis thermal conductivity in the substrate plane, wherein the a-axis thermal conductivity is greater than the c-axis thermal conductivity; and the hexagonal boron-nitride grains have an average size of at least about 10 nm in the substrate plane.

DETAILED DESCRIPTION

Figure 1:
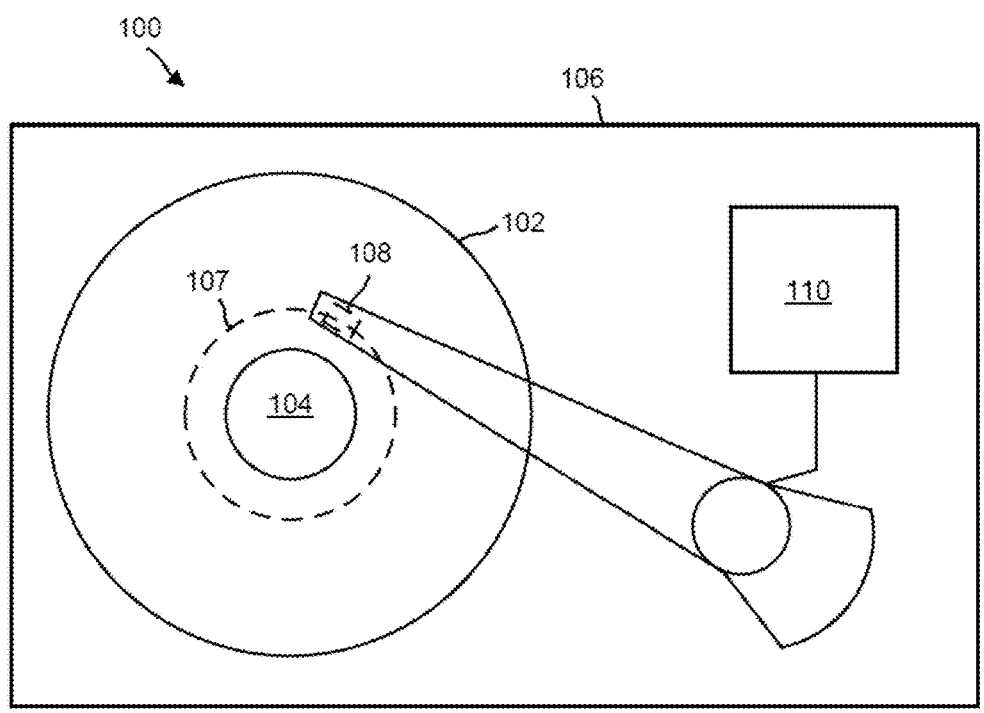
FIG. 1 is a top schematic view of a disk drive configured for HAMR including a magnetic recording medium of the present technology.

The following terms are used throughout as defined below.

As used herein and in the appended claims, singular articles such as "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

As used herein, "anisotropic" refers to the property of being directionally dependent. Anisotropic materials have different properties in different directions. For example, an anisotropic heat sink material has different thermal conductivity in different directions.

As used herein "on," "above," "below," and "between" refer to a relative position of one layer with respect to another layer or other layers. As such, one layer deposited or disposed on, above or below another layer may be directly in contact with the other layer or may have one or more intervening layers that lie between it and the other layer or layers. Moreover, one layer deposited or disposed between layers may be directly in contact with the layers or may have one or more intervening layers that lie between it and the other layer or layers.

Unless otherwise indicated, numeric ranges, for instance as in "from 2 to 10," are inclusive of the numbers defining the range (e.g., 2 and 10).

Unless otherwise indicated, ratios, percentages, parts, and the like are by weight.

It shall be appreciated by those skilled in the art that in lieu of the full names of chemical elements, the well-known symbols for chemical elements may be used herein to designate one or more chemical elements in the interest of brevity and clarity.

In HAMR technology, the recording medium is heated to above its Curie temperature (Tc) using a laser. As the recording medium cools, writing is then carried out during the refreezing process. Because the bit transitions are determined by the thermal gradients, as opposed to only the write field gradients, much higher linear/track densities can be achieved with HAMR as opposed to previous magnetic recording technologies. After heating the recording medium, the heat must be quickly dissipated away to prevent it from heating neighboring grains. To achieve quick heat dissipation, heat sink layers have been provided below recording mediums. However, heat sink layers commonly conduct the heat away equally in all directions including both down and across a film stack. Conducting heat across a film stack leads to heating of adjacent grains, which leads to poorly written bit transitions, adjacent track interference, and consequently, degraded recording performance. The present technology provides a magnetic recording medium for HAMR with an anisotropic heat sink layer that limits the thermal conductivity across the film stack.

FIG. 1 is a top schematic view of a disk drive 100 configured for HAMR including a magnetic recording medium of the present technology. The laser (not visible in FIG. 1 but see 114 in FIG. 2) is positioned with a head/slider 108. Disk drive 100 may include one or more disks/media 102 to store data. Disk/media 102 resides on a spindle assembly 104 that is mounted to drive housing 106. Data may be stored along tracks in the magnetic recording medium of disk 102. The reading and writing of data is accomplished with the head 108 that may have both read and write elements. The write element is used to alter the properties of the magnetic recording medium of disk 102 and thereby write information thereto. In one embodiment, head 108 may have magneto-resistive (MR), or giant magneto-resistive (GMR) elements. In another embodiment, head 108 may be another type of head, for example, an inductive read/write head or a Hall effect head. In operation, a spindle motor (not shown) rotates the spindle assembly 104, and thereby rotates disk 102 to position head 108 at a particular location along a desired disk track 107. The position of head 108 relative to disk 102 may be controlled by position control circuitry 110.

Figure 2:
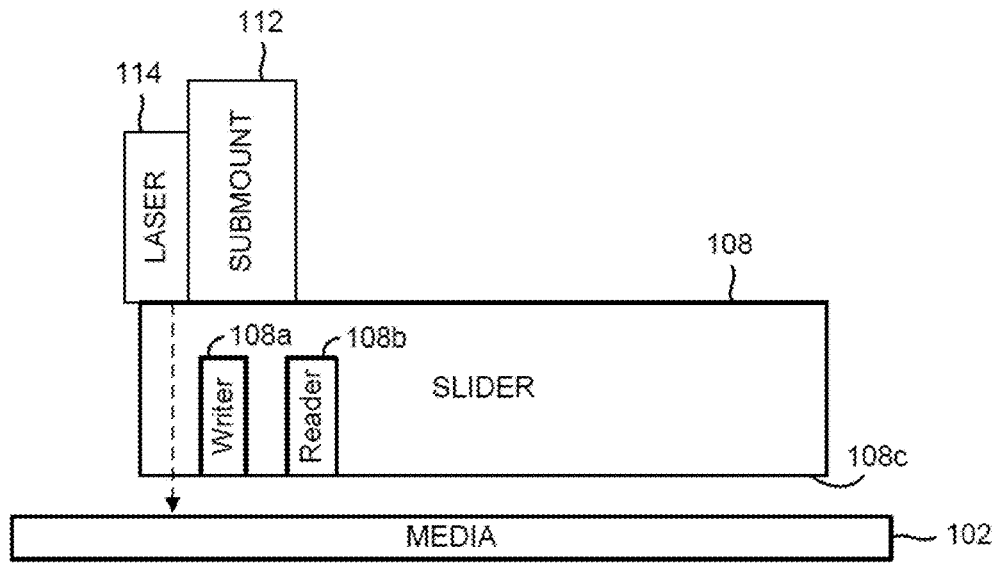
FIG. 2 is a side schematic view of the slider and HAMR magnetic recording medium of FIG. 1.

FIG. 2 is a side schematic view of the slider and HAMR magnetic recording medium of FIG. 1. The HAMR system components also include a sub-mount 112 attached to a top surface of the slider 108. The laser 114 is attached to the sub-mount 112, and possibly to the slider 108. The slider 108 includes the write element (e.g., writer) 108a and the read element (e.g., reader) 108b positioned along an air bearing surface (ABS) 108c of the slider for writing information to, and reading information from, respectively, the media/disk 102. In operation, the laser 114 is configured to generate and direct light energy to a waveguide (possibly along the dashed line) in the slider which directs the light to a near field transducer (NFT) near the air bearing surface (e.g., bottom surface) 108c of the slider 108. Upon receiving the light from the laser 114 via the waveguide, the NFT generates localized heat energy that heats a portion of the media/disk 102 near the write element 108a. FIGS. 1 and 2 illustrate a specific embodiment of a HAMR system. In other embodiments, the HAMR magnetic recording medium of the present technology can be used in other suitable HAMR systems.

Figure 3:
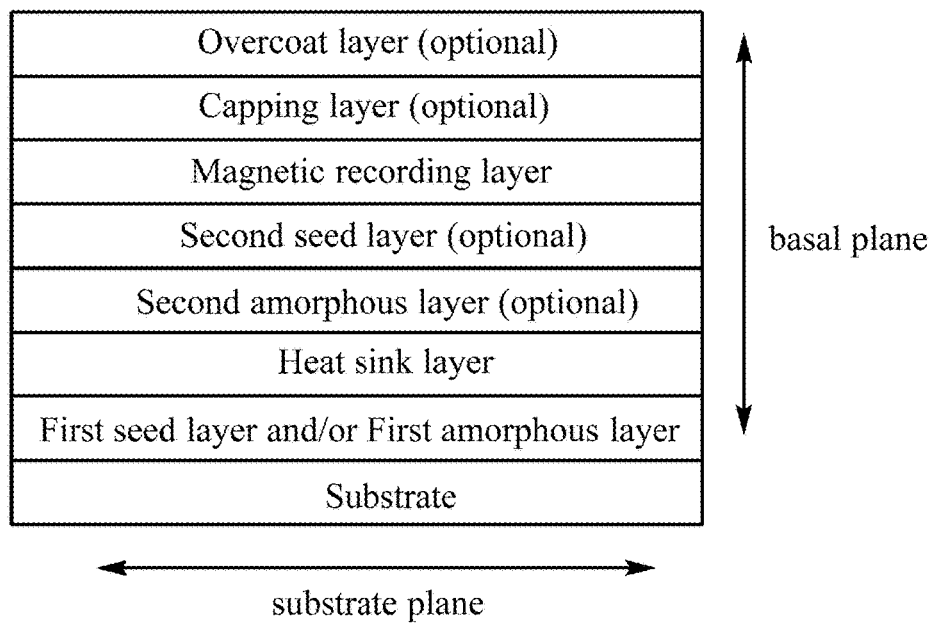
FIG. 3 is a side schematic view of an exemplary embodiment of the magnetic recording medium of the present technology.

The present technology provides a magnetic recording medium for HAMR that includes in ascending vertical sequence: (i) a substrate; (ii) a first amorphous layer, a first seed layer, or a combination thereof; (iii) a heat sink layer comprising hexagonal boron-nitride grains; (iv) an optional second amorphous layer; (v) an optional second seed layer; (vi) a magnetic recording layer; (vii) an optional capping layer; and (viii) an optional overcoat layer; wherein the magnetic recording medium has a substrate plane and a basal plane perpendicular to the substrate plane; the heat sink layer is anisotropic and has an a-axis thermal conductivity in the basal plane and a c-axis thermal conductivity in the substrate plane, wherein the a-axis thermal conductivity is greater than the c-axis thermal conductivity; and the hexagonal boron-nitride grains have an average size of at least about 10 nm in the substrate plane. FIG. 3 provides an exemplary embodiment of the magnetic recording medium. In some embodiments, the substrate is below the first seed layer, the first amorphous layer and/or first seed layer is below the heat sink layer, and the heat sink layer is below the magnetic recording layer. In some embodiments, if both the first amorphous layer and first seed layer are present, the first amorphous layer may be below the first seed layer. In some embodiments, if present, the second amorphous layer may be between the heat sink layer and the magnetic recording layer. In some embodiments, the second seed layer may be between the heat sink layer and the magnetic recording layer. In some embodiments, if both the second amorphous layer and second seed layer are present, the second amorphous layer may be below the second seed layer. In some embodiments, if present, the capping layer may be above the magnetic recording layer. In some embodiments, if present, the overcoat layer may be above the magnetic recording layer. In some embodiments, if present, the overcoat layer may be above the capping layer, which is above the magnetic recording layer. In some embodiments, the layers may be in direct contact and not contain any intervening layers.

Figure 4:
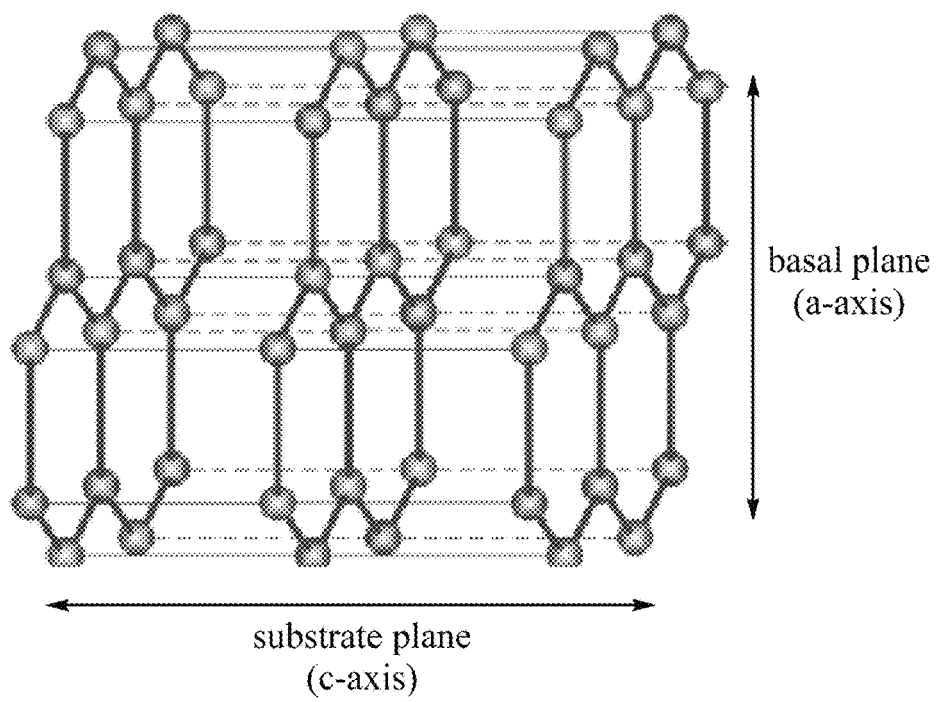
FIG. 4 is a partial side schematic view of a hexagonal boron-nitride grain.

In some embodiments, the hexagonal boron-nitride grain may be a single crystal structure. In some embodiments, the hexagonal boron-nitride grains may have a (002) crystal texture. As illustrated in FIG. 4, the covalent bonds of the hexagonal boron-nitride grain are parallel to the basal plane and Van der Waals interactions commonly occur perpendicular to the basal plane. In some embodiments, the hexagonal boron-nitride grains may have an average size of at least about 10 nm. In some embodiments, the hexagonal boron-nitride grains may have an average size of at least about 20 nm, about 30 nm, about 40 nm, or about 50 nm. In some embodiments, the hexagonal boron-nitride grains may have an average size of about 10 nm to about 1000 nm in the substrate plane. In some embodiments, the hexagonal boron-nitride grains may have an average size of about 20 nm to about 600 nm, about 30 nm to about 300 nm, about 40 nm to about 250 nm, or about 50 nm to about 200 nm in the substrate plane.

In some embodiments, the heat sink layer may have a thermal conductivity of at least about 45 W/mK in the basal plane (i.e., a-axis thermal conductivity). In some embodiments, the heat sink layer may have a thermal conductivity of at least about 50 W/mK, about 60 W/mK, about 80 W/mK, about 100 W/mK, about 200 W/mK, about 300 W/mK, about 400 W/mK, or about 500 W/mK in the basal plane. In some embodiments, the heat sink layer may have a thermal conductivity of about 45 W/mK to about 600 W/mK in the basal plane. In some embodiments, the heat sink layer may have a thermal conductivity of about 100 W/mK to about 400 W/mK or about 150 W/mK to about 250 W/mK in the basal plane.

In some embodiments, the heat sink layer may have a thermal conductivity of no more than about 40 W/mK in the substrate plane (i.e., c-axis thermal conductivity). In some embodiments, the heat sink layer may have a thermal conductivity of no more than about 35 W/mK, about 30 W/mK, about 25 W/mK, about 20 W/mK, about 15 W/mK, or about 10 W/mK in the substrate plane. In some embodiments, the heat sink layer may have a thermal conductivity of about 1 W/mK to about 40 W/mK in the substrate plane. In some embodiments, the heat sink layer may have a thermal conductivity of about 1 W/mK to about 30 W/mK or about 1 W/mK to about 20 W/mK in the substrate plane.

In some embodiments, the heat sink layer may have a thermal conductivity in the basal plane at least 1.5 times the thermal conductivity in the substrate plane. In some embodiments, the heat sink layer may have a thermal conductivity in the basal plane at least twice the thermal conductivity in the substrate plane. In some embodiments, the heat sink layer may have a thermal conductivity in the basal plane at least 3 times, 5 times, 10 times, or 15 times the thermal conductivity in the substrate plane.

In some embodiments, the heat sink layer may have a thickness of at least about 10 nm. In some embodiments, the heat sink layer may have a thickness of at least about 20 nm, 30 nm, 40 nm, or 50 nm. In some embodiments, the heat sink layer may have a thickness of less than about 1000 nm, 800 nm, 600 nm, or 500 nm. In some embodiments, the heat sink layer may have a thickness of about 10 nm to about 300 nm, about 20 nm to about 200 nm, or about 50 nm to about 100 nm. In some embodiments, the heat sink layer may have a surface roughness measured by atomic scale microscopy (AFM) less than about 6 Å, about 5 Å, or about 4 Å. In some embodiments, the heat sink layer may have a roughness measured by AFM of about 1.5 Å to about 6 Å, about 2.0 Å to about 5.0 Å, or about 2.5 Å to about 4.5 Å.

In some embodiments, the magnetic recording medium may include a first seed layer. In some embodiments, the first seed layer may provide adhesion. In some embodiments, the first seed layer may include one or more crystalline layers. In some embodiments, the one or more crystalline layers may include a hexagonal close packed (HCP) crystal structured layer, a body centered cubic (BCC) crystal structured layer, a B2 crystal structured layer, a B1 crystal structured layer, a spinel crystal structured layer, a perovskite crystal structured layer, or combinations of two or more thereof.

In some embodiments, the first seed layer may include a HCP crystal structured layer. In some embodiments, the HCP crystal structured layer may include Ru, Co, Zn, or combinations of two or more thereof. In some embodiments, the HCP crystal structure layer may have a (1120) crystal texture. In some embodiments, the HCP crystal structure layer may include Ru(1120), Co(1120), Zn(1120), or combinations of two or more thereof. In some embodiments, the HCP crystal structure layer may have a (0002) crystal texture. In some embodiments, the HCP crystal structure layer may include Ru(0002), Co(0002), Zn(0002), or combinations of two or more thereof.

In some embodiments, the first seed layer may include a BCC crystal structured layer. In some embodiments, the BCC crystal structured layer may include Cr, W, V, Mo, Nb, or combinations of two or more thereof. In some embodiments, the BCC crystal structure layer may have a (200) crystal texture. In some embodiments, the BCC crystal structure layer may include Cr(200), W(200), V(200), Mo(200), Nb(200), or combinations of two or more thereof.

In some embodiments, the first seed layer may include a B2 crystal structured layer. In some embodiments, the B2 crystal structured layer may include RuAl, NiAl, or a combination thereof. In some embodiments, the B2 crystal structure layer may have a (200) crystal texture. In some embodiments, the B2 crystal structure layer may include RuAl(200), NiAl(200), or a combination thereof.

In some embodiments, the first seed layer may include a B1 crystal structured layer. In some embodiments, the B1 crystal structured layer may include MgO, MgO—TiO, or a combination thereof.

In some embodiments, the first seed layer may include a spinel crystal structured layer. In some embodiments, the spinel crystal structured layer may include $MgAl_2O_4$.

In some embodiments, the first seed layer may include a perovskite crystal structured layer. In some embodiments, the perovskite crystal structured layer may include $SrTiO_3$.

In some embodiments, the one or more crystalline layers may include crystals with grain sizes of at least about 10 nm. In some embodiments, the grain sizes are at least about 20 nm, 30 nm, 40 nm, or 50 nm. In some embodiments, the one or more crystalline layers may include crystals with grain sizes of about 10 nm to about 1000 nm. In some embodiments, the grains may have an average size of about 20 nm to about 600 nm, about 30 nm to about 300 nm, about 40 nm to about 250 nm, or about 50 nm to about 200 nm. In some embodiments, the one or more crystalline layers may have a thickness of at least about 0.5 nm, about 0.75 nm, or about 1 nm. In some embodiments, the one or more crystalline layers may have a thickness of no more than about 50 nm, about 40 nm, about 30 nm, about 20 nm, or about 10 nm. In some embodiments, the one or more crystalline layers may have a thickness of about 0.5 nm to about 50 nm, about 0.75 nm to about 25 nm, or about 1 nm to about 10 nm.

In some embodiments, the first seed layer may include a ceramic layer. In some embodiments, the first seed layer may include one or more crystalline layers and a ceramic layer. In some embodiments, the ceramic layer may include MgO, $SiO_2$, or combinations thereof. In some embodiments, the ceramic layer may include MgO. In some embodiments, the ceramic layer may include MgO(002). In some embodiments, the ceramic layer may have a thickness of no more than about 20 nm, about 15 nm, or about 10 nm. In some embodiments, the ceramic layer may have a thickness of about 0.5 nm to about 20 nm, about 0.75 nm to about 15 nm, or about 1 nm to about 10 nm.

In some embodiments, the magnetic recording medium may include a first seed layer. In some embodiments, the magnetic recording medium may include a second seed layer. In some embodiments, the magnetic recording medium may include a first seed layer and a second seed layer. In some embodiments, the second seed layer may include one or more crystalline layers as described herein. In some embodiments, the second seed layer may include a ceramic layer as described herein. In some embodiments, the first and second seed layers may be the same. In some embodiments, the first and second seed layers may be different.

In some embodiments, the magnetic recording medium may include a first amorphous layer. In some embodiments, the magnetic recording medium may include a second amorphous layer. In some embodiments, the magnetic recording medium may include both a first and a second amorphous layer. In some embodiments, the first and/or second amorphous layer may provide adhesion. In some embodiments, the first and second amorphous layers may individually include CrTa, CrTi, NiTa, NiCrTa, CoCrTaZr, CoTaZr, CoCrWTaZr, CoCrMoTaZr, CoZrWMo, CoFeX wherein X comprises Si, Ta, Zr, B, and/or W, or combinations of two or more thereof. In some embodiments, CoFeX may include CoFeZrBCr, CoFeTaZr, or a combination thereof. In some embodiments, the first and/or second amorphous layers may include CrTa. In some embodiments, the first and second amorphous layers may be the same. In some embodiments, the first and second amorphous layers may be different. In some embodiments, the first and second amorphous layers may have a thickness of no more than about 20 nm, about 15 nm, or about 10 nm. In some embodiments, the first and/or second amorphous layers may have a thickness about 1 nm to about 20 nm. In some embodiments, the first and/or second amorphous layers may have a thickness about 1 nm to about 10 nm.

In some embodiments, the magnetic recording medium may include a first seed layer and a first amorphous layer, wherein the first seed layer includes one or more crystalline layers. In some embodiments, the magnetic recording medium may include a first seed layer and a first amorphous layer, wherein the first seed layer includes a ceramic layer. In some embodiments, the magnetic recording medium may include a first seed layer and a first amorphous layer, wherein the first seed layer includes one or more crystalline layers and a ceramic layer.

In some embodiments, the substrate may include Al alloy, NiP plated Al, glass, glass ceramic, or combinations of two or more thereof. In some embodiments, the substrate may include glass.

In some embodiments, the magnetic recording layer may include FePt, CoPt, FePd, segregants (e.g., silicon dioxide, boron-nitride, and/or carbon), or combinations of two or more thereof. In some embodiments, the magnetic recording layer may include $L1_0$ phase FePt. In some embodiments, the magnetic recording layer may include one or more layers. In some embodiments, the magnetic recording layer may have thickness of about 5 nm to about 20 nm. In some embodiments, the magnetic recording layer may have thickness of about 6 nm to about 15 nm.

In some embodiments, the magnetic recording medium may include a capping layer. In some embodiments, the capping layer may be above the magnetic recording layer. In some embodiments, the capping layer may include Co, Pt, Pd, CoFe, CoFeB, CoPt, or combinations of two or more thereof. In some embodiments, the capping layer may include Co, Pt, Pd, or combinations of two or more thereof. In some embodiments, the capping layer may include two or more layers including a top layer and a bottom layer. In some embodiments, the top layer may include Co and the bottom layer may include Pt or Pd. In addition to the Co/Pt and Co/Pd combinations of top layer/bottom layer, specific combinations of the top layer materials and the bottom layer materials may include, for example, Co/Au, Co/Ag, Co/Al, Co/Cu, Co/Ir, Co/Mo, Co/Ni, Co/Os, Co/Ru, Co/Ti, Co/V, Fe/Ag, Fe/Au, Fe/Cu, Fe/Mo, Fe/Pd, Ni/Au, Ni/Cu, Ni/Mo, Ni/Pd, Ni/Re, etc. In some embodiments, top layer materials and bottom layer materials include any combination of Pt and Pd (e.g., alloys), or any of the following elements, alone or in combination: Au, Ag, Al, Cu, Ir, Mo, Ni, Os, Ru, Ti, V, Fe, and Re. In some embodiments, the capping layer may have a thickness of no more than about 5 nm, about 4 nm, or about 3 nm. In some embodiments, the capping layer may have thickness of about 0.5 nm to about 5 nm. In some embodiments, the capping layer may have thickness of about 1 nm to about 3 nm.

In some embodiments, the magnetic recording medium may include an overcoat layer. In some embodiments, the overcoat layer may include carbon. In some embodiments, the overcoat layer may include carbon-$H_2$, carbon-$N_2$, or combinations thereof. In some embodiments, the overcoat layer may have a thickness of no more than about 5 nm, about 4 nm, or about 3 nm. In some embodiments, the overcoat layer may have thickness of about 0.1 nm to about 5 nm. In some embodiments, the overcoat layer may have thickness of about 0.5 nm to about 3 nm.

In some embodiments, the magnetic recording medium may include a lubricant layer on the overcoat layer. The lubricant layer may include one or more known lubricating materials such as polymer based lubricants and/or other suitable materials known to those of skill in the art.

In some embodiments, the magnetic recording medium may include a first seed layer that includes (a) a HCP crystal structured layer that includes Ru; (b) a BCC crystal structured layer that includes Cr; and (c) a B2 crystal structured layer that includes RuAl. In some embodiments, (a) may be above (b) and (b) may be above (c). In some embodiments, (a), (b), and (c) may not include any intervening layers. In some embodiments, the magnetic recording medium may include a first seed layer and a first amorphous layer below the first seed layer. In some embodiments, there may not be any intervening layers between the first seed layer and the first amorphous layer. In some embodiments, the magnetic recording medium may further include a second seed layer, a second amorphous layer, or a combination thereof.

In some embodiments, the magnetic recording medium may include a first seed layer that includes (a) a BCC crystal structured layer that includes Cr and (b) a B2 crystal structured layer that includes RuAl. In some embodiments, (a) may be above (b). In some embodiments, (a) and (b) may not include any intervening layers. In some embodiments, the magnetic recording medium may include a first seed layer and a first amorphous layer below the first seed layer. In some embodiments, there may not be any intervening layers between the first seed layer and the first amorphous layer. In some embodiments, the magnetic recording medium may further include a second seed layer, a second amorphous layer, or a combination thereof.

In some embodiments, the magnetic recording medium may include a first seed layer that includes (a) a B2 crystal structured layer that includes RuAl. In some embodiments, the magnetic recording medium may include a first seed layer and a first amorphous layer below the first seed layer. In some embodiments, there may not be any intervening layers between the first seed layer and the first amorphous layer. In some embodiments, the magnetic recording medium may further include a second seed layer, a second amorphous layer, or a combination thereof.

In some embodiments, the magnetic recording medium may include a first seed layer that includes (a) a spinel crystal structured layer that includes $MgAl_2O_4$. In some embodiments, the magnetic recording medium may include the first seed layer and not include a first amorphous layer. In some embodiments, the magnetic recording medium may further include a second seed layer, a second amorphous layer, or a combination thereof.

In some embodiments, the magnetic recording medium may include a first amorphous layer and not include a first seed layer. In some embodiments, the magnetic recording medium may further include a second seed layer, a second amorphous layer, or a combination thereof.

In another aspect, the present technology contemplates a method of manufacturing a magnetic recording medium for HAMR that includes providing sequentially: (i) a substrate; (ii) a first amorphous layer, a first seed layer, or a combination thereof; (iii) a heat sink layer comprising hexagonal boron-nitride grains; (iv) an optional second amorphous layer; (v) an optional second seed layer; (vi) a magnetic recording layer; (vii) an optional capping layer; and (viii) an optional overcoat layer; wherein the magnetic recording medium has a substrate plane and a basal plane perpendicular to the substrate plane; the heat sink layer is anisotropic and has an a-axis thermal conductivity in the basal plane and a c-axis thermal conductivity in the substrate plane, wherein the a-axis thermal conductivity is greater than the c-axis thermal conductivity; and the hexagonal boron-nitride grains have an average size of at least about 10 nm in the substrate plane. The substrate, first amorphous layer, first seed layer, heat sink layer, second amorphous layer, second seed layer, magnetic recording layer, capping layer, and overcoat layer may be as described herein.

In some embodiments, the heat sink layer may be provided by depositing a heat sink material that includes hexagonal boron-nitride grains by radio-frequency (RF) sputtering, high temperature and/or high pressure sputtering, chemical vapor deposition (CVD), or combinations of two or more thereof. High temperature and/or high pressure sputtering includes, but is not limited to, High-power Impulse Magnetron Sputtering (HiPIMS). CVD includes, but is not limited to, Metal-Organic CVD (MO-CVD) and Plasma-Enhanced CVD (PECVD).

In some embodiments, the depositing of the heat sink material may occur at a temperature of at least about 200° C., about 300° C., about 400° C., or about 500° C. In some embodiments, the depositing of the heat sink material may occur at a temperature of no more than about 800° C., about 700° C., or about 600° C. In some embodiments, the depositing of the heat sink material may occur at a temperature range of about 200° C. to about 800° C. In some embodiments, the deposition of the heat sink material may occur at a temperature range of about 300° C. to about 750° C., about 400° C. to about 700° C., about 500° C. to about 650° C., about 350° C. to about 700° C., or about 400° C. to about 600° C.

In some embodiments, the depositing of the heat sink material may occur at a pressure of at least about 1 mtorr. In some embodiments, the depositing of the heat sink material may occur at a pressure of about 1.5 mtorr to about 5 torr or about 1 torr to about 3 torr.

In some embodiments, the depositing of the heat sink material may occur in the presence of a gaseous environment. In some embodiments, the gaseous environment may include argon gas, nitrogen gas, or a combination thereof. In some embodiments, the molar ratio of nitrogen gas to argon gas is from about 1:9 to about 9:1. In some embodiments, the molar ratio of nitrogen gas to argon gas is from about 1:5 to about 5:1 or about 1:2 to about 2:1. In some embodiments, the molar ratio of nitrogen gas to argon gas may be about 1:1.

In some embodiments, the method may further include annealing. In some embodiments, annealing may occur before, after, or both before and after providing the heat sink layer. In some embodiments, annealing may occur before providing the heat sink layer. In some embodiments, annealing may occur after providing the heat sink layer. In some embodiments, annealing may occur before providing the magnetic recording layer. In some embodiments, the annealing may occur at a temperature up to about 600° C. In some embodiments, the annealing may occur at a temperature of about 400° C. to about 600° C.

It should be appreciated by those skilled in the art in view of the present disclosure that although various exemplary fabrication methods are discussed herein with reference to magnetic recording disks, the methods, with or without some modifications, may be used for fabricating other types of recording disks, for example, optical recording disks such as a compact disc (CD) and a digital-versatile-disk (DVD), or magneto-optical recording disks, or ferroelectric data storage devices.

EXAMPLES

The examples herein are provided to illustrate advantages of the present technology and to further assist a person of ordinary skill in the art with preparing or using the magnetic recording medium of the present technology. The examples should in no way be construed as limiting the scope of the present technology, as defined by the appended claims. The examples can include or incorporate any of the variations or aspects of the present technology described above. The variations or aspects described above may also further each include or incorporate the variations of any or all other variations or aspects of the present technology.

Figure 5:
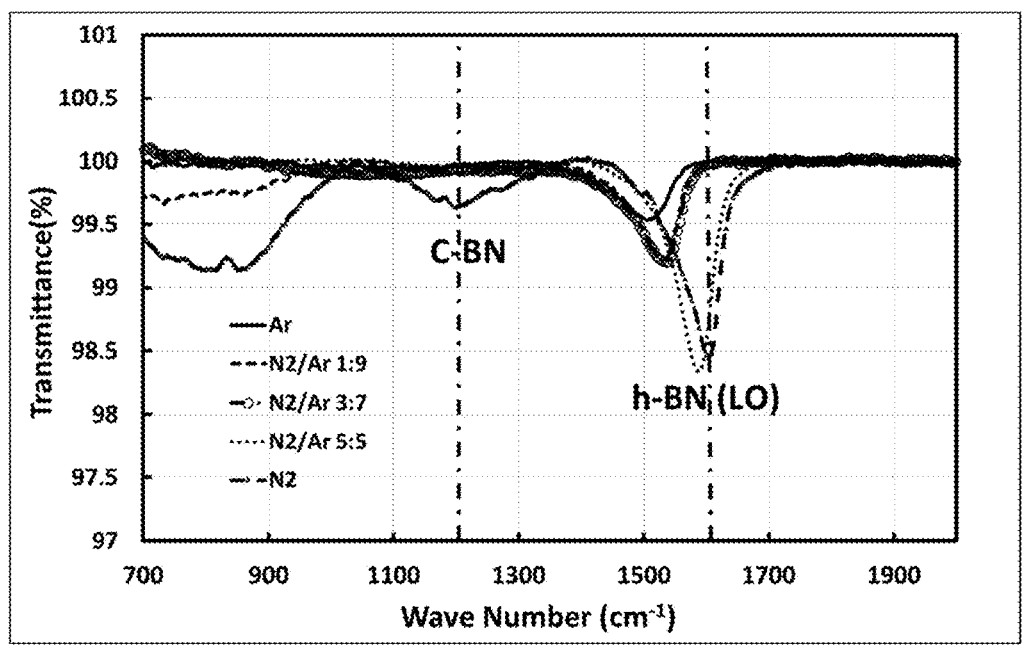
FIG. 5 is a FTIR of hexagonal boron-nitride film layers applied at room temperature using various gas mixtures.
Figure 6:
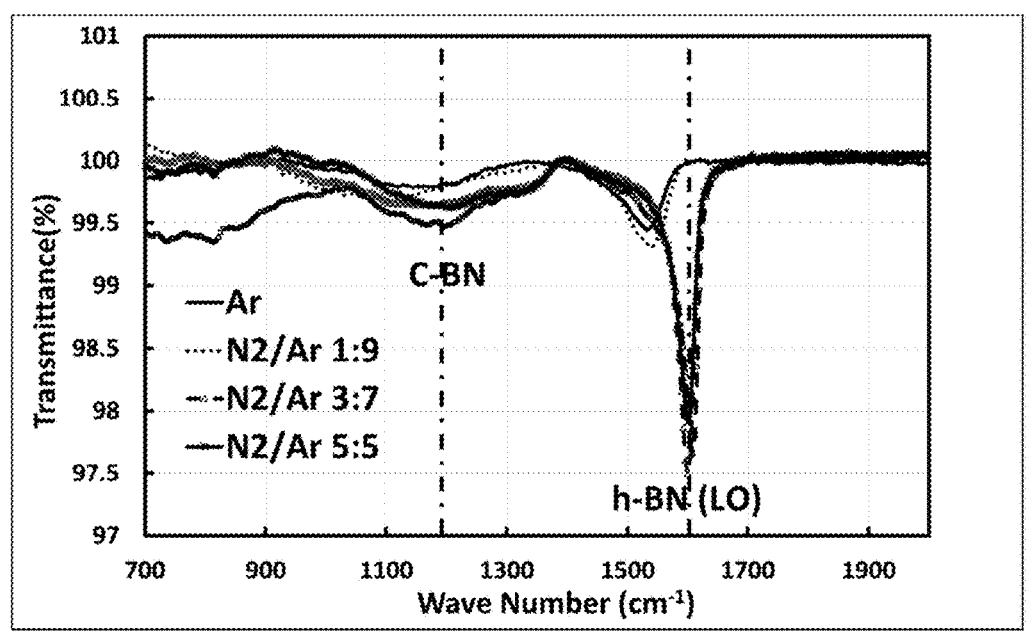
FIG. 6 is a FTIR of hexagonal boron-nitride film layers applied at 600° C. using various gas mixtures.

Example 1: Hexagonal Boron-Nitride (h-BN) Heat Sink Layer Deposited with Various Gas Mixtures Film layers of h-BN with a thickness of 20 nm were deposited with the c-axis oriented in the substrate plane using RF sputtering and various sputter gas mixtures of argon and nitrogen. FIG. 5 provides the Fourier Transform Infrared Spectroscopy (FTIR) scans when sputtering was conducted at room temperature and FIG. 6 provides FTIR scans when sputtering was conducted at 600° C. At both temperatures, the films were strongly textured with the c-axis in the substrate plane.

Figure 7:
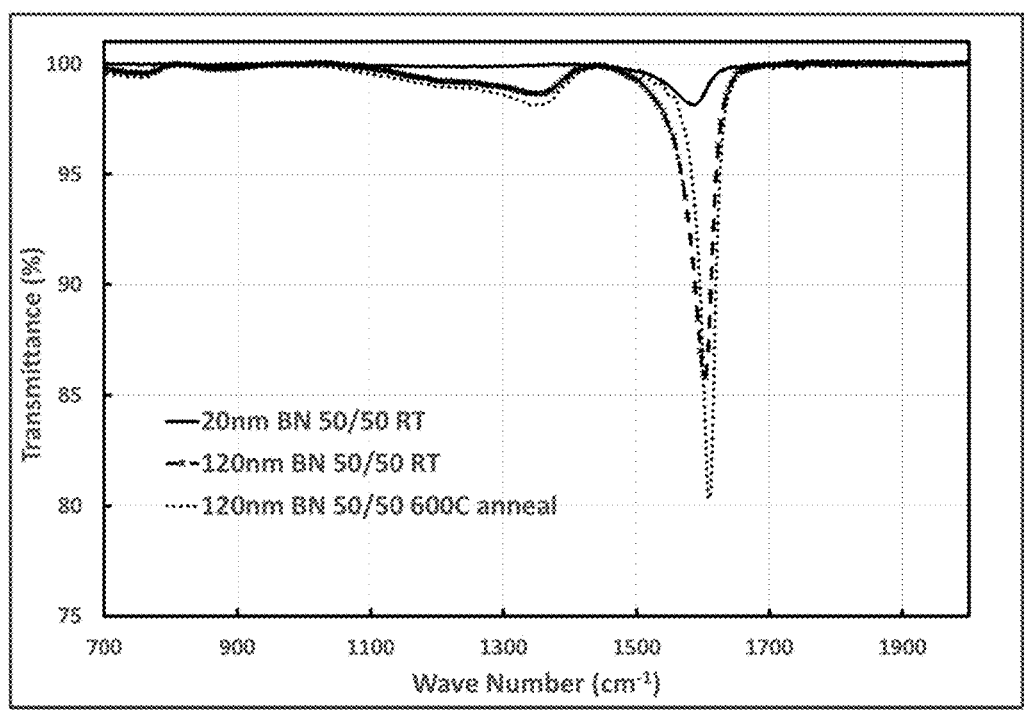
FIG. 7 is a FTIR of hexagonal boron-nitride film layers at different thicknesses before and after annealing at 600° C.

Example 2: Hexagonal Boron-Nitride (h-BN) Heat Sink Layer Deposited with Varying Thickness Film layers of h-BN with a thickness of 20 nm or 120 nm were deposited at room temperature with the c-axis oriented in the substrate plane using RF sputtering and a sputter gas mixture of 50% argon and 50% nitrogen. FIG. 7 provides the FTIR scans before and after annealing the films at 600° C. The films were strongly textured with the c-axis in the substrate plane even after post-annealing.

EQUIVALENTS

While certain embodiments have been illustrated and described, a person with ordinary skill in the art, after reading the foregoing specification, can effect changes, substitutions of equivalents and other types of alterations to the compositions of the present technology as set forth herein. Each aspect and embodiment described above can also have included or incorporated therewith such variations or aspects as disclosed in regard to any or all of the other aspects and embodiments.

The present technology is also not to be limited in terms of the particular aspects described herein, which are intended as single illustrations of individual aspects of the present technology. Many modifications and variations of this present technology can be made without departing from its spirit and scope, as will be apparent to those skilled in the art. Functionally equivalent methods within the scope of the present technology, in addition to those enumerated herein, will be apparent to those skilled in the art from the foregoing descriptions. Such modifications and variations are intended to fall within the scope of the appended claims. It is to be understood that this present technology is not limited to particular methods, reagents, compounds, or compositions, which can, of course, vary. It is also to be understood that the terminology used herein is for the purpose of describing particular aspects only, and is not intended to be limiting. Thus, it is intended that the specification be considered as illustrative only with the breadth, scope and spirit of the present technology indicated only by the appended claims, definitions therein and any equivalents thereof.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

In addition, where features or aspects of the disclosure are described in terms of Markush groups, those skilled in the art will recognize that the disclosure is also thereby described in terms of any individual member or subgroup of members of the Markush group. Each of the narrower species and subgeneric groupings falling within the generic disclosure also form part of the technology. This includes the generic description of the technology with a proviso or negative limitation removing any subject matter from the genus, regardless of whether or not the excised material is specifically recited herein.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents (for example, journals, articles and/or textbooks) referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims, along with the full scope of equivalents to which such claims are entitled.

What is claimed is:

1. A magnetic recording medium for heat assisted magnetic recording comprising in ascending vertical sequence:
   (i) a substrate;
   (ii) a first amorphous layer, a first seed layer, or a combination thereof;
   (iii) a heat sink layer comprising hexagonal boron-nitride grains;
   (iv) an optional second amorphous layer;
   (v) an optional second seed layer;
   (vi) a magnetic recording layer;
   (vii) an optional capping layer; and
   (viii) an optional overcoat layer;
   wherein:
      the magnetic recording medium has a substrate plane and a basal plane perpendicular to the substrate plane;
      the heat sink layer is anisotropic and has an a-axis thermal conductivity in the basal plane and a c-axis thermal conductivity in the substrate plane, wherein the a-axis thermal conductivity is greater than the c-axis thermal conductivity; and
      the hexagonal boron-nitride grains have an average size of at least about 10 nm in the substrate plane.

2. The magnetic recording medium of claim 1, wherein the hexagonal boron-nitride grains have an average size of about 10 nm to about 1000 nm in the substrate plane.

3. The magnetic recording medium of claim 1, wherein the hexagonal boron-nitride grains have an average size of about 50 nm to about 200 nm in the substrate plane.

4. The magnetic recording medium of claim 1, wherein the heat sink layer has a thermal conductivity of at least about 45 W/mK in the basal plane.

5. The magnetic recording medium of claim 1, wherein the heat sink layer has a thermal conductivity of about 45 W/mK to about 600 W/mK in the basal plane.

6. The magnetic recording medium of claim 1, wherein the heat sink layer has a thermal conductivity of no more than about 40 W/mK in the substrate plane.

7. The magnetic recording medium of claim 1, wherein the heat sink layer has a thickness of at least about 10 nm.

8. The magnetic recording medium of claim 1 comprising the first seed layer, wherein the first seed layer comprises one or more crystalline layers.

9. The magnetic recording medium of claim 8, wherein the one or more crystalline layers comprises a hexagonal close packed (HCP) crystal structured layer, a body centered cubic (BCC) crystal structured layer, a B2 crystal structured layer, a B1 crystal structured layer, a spinel crystal structured layer, a perovskite crystal structured layer, or combinations of two or more thereof.

10. The magnetic recording medium of claim 9, wherein the first seed layer comprises the HCP crystal structured layer.

11. The magnetic recording medium of claim 9, wherein the first seed layer comprises the BCC crystal structured layer.

12. The magnetic recording medium of claim 9, wherein the first seed layer comprises the B2 crystal structured layer.

13. The magnetic recording medium of claim 9, wherein the first seed layer comprises the B1 crystal structured layer.

14. The magnetic recording medium of claim 9, wherein the first seed layer comprises the spinel crystal structured layer.

15. The magnetic recording medium of claim 9, wherein the first seed layer comprises the perovskite crystal structured layer.

16. The magnetic recording medium of claim 1 comprising the first seed layer, wherein the first seed layer comprises a ceramic layer.

17. The magnetic recording medium of claim 8 further comprising the first amorphous layer.

18. The magnetic recording medium of claim 16 further comprising the first amorphous layer.

19. The magnetic recording medium of claim 1 comprising the first amorphous layer.

20. A method of for manufacturing a magnetic recording medium for heat assisted magnetic recording comprising providing sequentially:

(i) a substrate;
(ii) a first amorphous layer, a first seed layer, or a combination thereof;
(iii) a heat sink layer comprising hexagonal boron-nitride grains;
(iv) an optional second amorphous layer;
(v) an optional second seed layer;
(vi) a magnetic recording layer;
(vii) an optional capping layer; and
(viii) an optional overcoat layer;

wherein:
the magnetic recording medium has a substrate plane and a basal plane perpendicular to the substrate plane;
the heat sink layer is anisotropic and has an a-axis thermal conductivity in the basal plane and a c-axis thermal conductivity in the substrate plane, wherein the a-axis thermal conductivity is greater than the c-axis thermal conductivity; and
the hexagonal boron-nitride grains have an average size of at least about 10 nm in the substrate plane.

\* \* \* \* \*